(12) United States Patent
Zhao et al.

(10) Patent No.: US 9,874,786 B2
(45) Date of Patent: Jan. 23, 2018

(54) COLOR FILM SUBSTRATE, DISPLAY PANEL AND DISPLAY DEVICE

(71) Applicant: BOE TECHNOLOGY GROUP CO., LTD., Beijing (CN)

(72) Inventors: Weili Zhao, Beijing (CN); Guangxiong Wu, Beijing (CN); Chang Xie, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 122 days.

(21) Appl. No.: 14/436,931

(22) PCT Filed: Aug. 26, 2014

(86) PCT No.: PCT/CN2014/085171
§ 371 (c)(1),
(2) Date: Apr. 20, 2015

(87) PCT Pub. No.: WO2015/158090
PCT Pub. Date: Oct. 22, 2015

(65) Prior Publication Data
US 2016/0026023 A1    Jan. 28, 2016

(30) Foreign Application Priority Data

Apr. 18, 2014 (CN) .......................... 2014 1 0158803

(51) Int. Cl.
*G02B 5/22* (2006.01)
*G02B 7/00* (2006.01)
(Continued)

(52) U.S. Cl.
CPC .... *G02F 1/13394* (2013.01); *G02F 1/133305* (2013.01); *G02F 1/133514* (2013.01); *G02F 2001/13396* (2013.01)

(58) Field of Classification Search
CPC ...... G02B 7/006; G02B 26/008; B02B 5/201; G02F 1/133514; H04N 9/3114
(Continued)

(56) References Cited

U.S. PATENT DOCUMENTS 9,372,369 B2 *  6/2016  Zheng ................. G02F 1/13394
9,690,144 B2 *  6/2017  Wu ...................... G02F 1/13394
(Continued)

FOREIGN PATENT DOCUMENTS

CN       101566756 A      10/2009
CN       101750780        6/2010
(Continued)

OTHER PUBLICATIONS

Search Report and Written Opinion from PCT/CN2014/085171, dated Jan. 12, 2015.
(Continued)

*Primary Examiner* — Bumsuk Won
*Assistant Examiner* — Tamara Y Washington
(74) *Attorney, Agent, or Firm* — Westman, Champlin & Koehler, P.A.

(57) ABSTRACT

A color film substrate, a display panel and a display device are provided. The color film substrate comprises: a flexible base substrate partitioned to a plurality of sub-regions based on a plurality of parallel lines that is paralleled with a setting central axis of the base substrate, the plurality of sub-regions having the same area as each other; and a plurality of photo spacers provided in each of the plurality of sub-regions. For any one of the plurality of sub-regions, each of the photo spacers in one of the plurality of sub-regions is configured such that a thickness of the display panel at a position corresponding to the photo spacers is increasingly changed under the same pressure force as a distance of said one of the plurality of sub-regions from the setting central axis
(Continued)

increases. As a result, a thickness of a liquid crystal cell of the display panel can be maintained to be uniform when the display panel is bent.

13 Claims, 2 Drawing Sheets

(51) Int. Cl.
    *G02F 1/1339*     (2006.01)
    *G02F 1/1333*     (2006.01)
    *G02F 1/1335*     (2006.01)

(58) Field of Classification Search
    USPC .................................................. 359/885–895
    See application file for complete search history.

(56) References Cited

U.S. PATENT DOCUMENTS

| | | | |
|---|---|---|---|
| 9,746,717 B2 * | 8/2017 | Xie | ...................... G02F 1/13394 |
| 2011/0228190 A1 * | 9/2011 | Yang | ................... G02F 1/13394 |
| | | | 349/56 |
| 2014/0092350 A1 * | 4/2014 | Byeon | ................... G02F 1/1339 |
| | | | 349/106 |

FOREIGN PATENT DOCUMENTS

| | | |
|---|---|---|
| CN | 102566126 | 7/2012 |
| CN | 103713426 | 4/2014 |
| CN | 103969891 | 8/2014 |
| CN | 203825337 | 9/2014 |
| JP | 2009-115933 A | 5/2009 |
| TW | I411985 B | 10/2013 |
| WO | WO 2007/034622 | 3/2007 |

OTHER PUBLICATIONS

First Office Action, including Search Report, for Chinese Patent Application No. 201410158803.X, dated Jan. 28, 2016, 13 pages.
English translation of Box No. V of the Written Opinion of the International Searching Authority for International Application No. PCT/CN2014/085171, dated Dec. 25, 2014, 2 pages.
Second Office Action for Chinese Patent Application No. 201410158803.X, dated Jun. 27, 2016, 12 pages.
Rejection Decision for Chinese Patent Application No. 201410158803.X, dated Sep. 1, 2016, 13 pages.

* cited by examiner

COLOR FILM SUBSTRATE, DISPLAY PANEL AND DISPLAY DEVICE

CROSS-REFERENCE TO RELATED APPLICATION

This Application is a Section 371 National Stage Application of International Application No. PCT/CN2014/085171, filed Aug. 26, 2014, which as not yet published, which claims priority to Chinese Patent Application No. 201410158803.X, filed Apr. 18, 2014, in Chinese, the contents of which are hereby incorporated by reference in their entirety.

FIELD OF THE DISCLOSURE

The present disclosure relates to field of liquid crystal display technology, and particularly, to a color film substrate, a display panel having the color film substrate and a display device.

DESCRIPTION OF THE RELATED ART

A liquid crystal display device controls light flux by liquid crystal that is disposed as light valve, so as to achieve displaying of pictures. Specifically, the control of the optical light by the liquid crystal under an electrical field is related to thickness of the liquid crystal. In order to obtain better display performance, it is necessary to maintain the thickness of liquid crystal layer at a stable value.

Generally, a color film substrate of a liquid crystal display panel is provided with a plurality of photo spacers that are distributed evenly and have uniform sizes and heights, such that a thickness of a liquid crystal cell between the color film substrate and an array substrate in the liquid crystal panel, is maintained, and thus a thickness of a liquid crystal layer filled within the liquid crystal cell is kept to be uniform and stable. The plurality of photo spacers is generally columnar photo spacers and, may be brought into contact with the array substrate, respectively. In addition, a size of the photo spacer means a contact area of the photo spacer being brought into contact with the color film substrate.

However, as shown in FIG. 1, in a bendable and flexible liquid crystal display device, a central portion and a periphery portion of a bent display surface of the flexible liquid crystal display panel are subject to different forces when the flexible liquid crystal display panel is bent, wherein a region further away from the central position is subject to smaller pressure force with relative to the central portion. If a thickness of a liquid crystal cell is still maintained by configuring a plurality of photo spacers that are with uniform sizes and heights and are distributed evenly on the color film substrate of the flexible liquid crystal display panel, the liquid crystal cell at a central position would suffer the most pressure force and thus, at which these photo spacers are deformed to the most degree and the thickness of the liquid crystal cell would be smallest, while a thickness of the liquid crystal cell at others positions would be increasing as its distance from the central position being increased, which largely degrades uniformity of the thickness of the liquid crystal cell during the bending of the flexible liquid crystal display panel, adversely affecting common display of the liquid crystal display device.

SUMMARY OF THE DISCLOSURE

A color film substrate, a display panel having the color film substrate, and a display device are provided according to embodiments of the present disclosure provides, as a result, the thickness of the liquid crystal cell of the display panel is maintained to be uniform when the display panel is bent, thereby improving a display performance.

According to an embodiment of an aspect of the present disclosure, there is provided a color film substrate for a display panel, the color film substrate comprising: a flexible base substrate partitioned to a plurality of sub-regions based on a plurality of parallel lines that is paralleled with a setting central axis of the base substrate, the plurality of sub-regions having the same area as each other; and a plurality of photo spacers provided in each of the plurality of sub-regions, wherein, for any one of the plurality of sub-regions, each of the photo spacers in said one of the plurality of sub-regions is configured such that a thickness of the display panel at a position corresponding to the photo spacers is increasingly changed under the same pressure force as a distance of said one of the plurality of sub-regions from the setting central axis increases.

In the abovementioned color film substrate, a sum of a contact area of each of the photo spacers in said one of the plurality of sub-regions being brought into contact with the base substrate becomes smaller as the distance of said one of the plurality of sub-regions from the setting central axis increases.

In the abovementioned color film substrate, a height of each of the photo spacers in said one of the plurality of sub-regions becomes smaller as a distance of said one of the plurality of sub-regions from the setting central axis increases.

In the abovementioned color film substrate, the setting central axis may comprise a centrally lateral axis of the base substrate or a centrally longitudinal axis of the base substrate.

In the abovementioned color film substrate, any two said photo spacers in said one of the plurality of sub-regions have the same height, and the same contact area that is brought into contact with the base substrate.

In the abovementioned color film substrate, the photo spacers in every one of the plurality of sub-regions have the same distribution density, and a contact area of any one of the photo spacers in said one of the sub-regions being brought into contact with the base substrate becomes smaller as a distance of said one of the plurality of sub-regions from the setting central axis increases; or any one of the photo spacers in every one of the plurality of sub-regions has the same contact area that is brought into contact with the base substrate, and the distribution density of the photo spacers in said one of the sub-regions decreases as a distance of said one of the plurality of sub-regions from the setting central axis increases.

In the abovementioned color film substrate, any two of the plurality of photo spacers have the same shape.

In the abovementioned color film substrate, the plurality of photo spacers is respectively columnar photo spacers.

In the abovementioned color film substrate, a cross-sectional area of each of the plurality of photo spacers at its bottom end is greater than or equal to that of the one at its top end, the bottom end of the one being brought into contact with the base substrate.

In the abovementioned color film substrate, the cross section of each of the plurality of photo spacers may be circle, rectangle or triangle in shape.

In the abovementioned color film substrate, any two of the plurality of photo spacers are made of the same material.

According to another embodiment of an aspect of the present disclosure, there is provided a display panel, comprising: the abovementioned color film substrate, and a flexible array substrate opposite to the color film substrate.

In the above display panel, some or all of the plurality of photo spacers in the color film substrate are brought into contact with the array substrate.

According to an embodiment of a further aspect of the present disclosure, there is provided a display device, comprising the display panel according to any one of the abovementioned embodiments.

With the color film substrate, the display panel and the display device having the color film substrate according to embodiments of the present disclosure, it can achieve a uniform thickness of the liquid crystal cell of the display panel during the bending of the display panel and thus achieve improved display performance, which is resulted from the factors that the photo spacers in each of the sub-regions are configured such that they are deformed in gradient in height direction under the same pressure force in accordance with a distance from the sub-region where the photo spacers are located to the setting central axis of the base substrate.

BRIEF DESCRIPTION OF THE DRAWINGS

In order to illustrate clearly the technical solutions in embodiments of the present disclosure, the accompanying drawings which will be used during describing the embodiments are provided and briefly described herein. The below description for the accompanying drawings are presented merely for embodiments of the present disclosure, and it is obvious for those skilled in the art to obtain other accompanying drawings based on the below drawings without involving any inventive labour.

DETAILED DESCRIPTION OF THE PREFERRED EMBODIMENTS

Technical solutions of the present disclosure will be described explicitly and fully hereinafter in detail by the way of embodiments with reference to the accompanying drawings. Obviously, the described embodiments are only some of embodiments of the present disclosure, rather than all the embodiments. Other embodiments obtained without involving inventive labors by those skilled in the art based on the described embodiments of the present disclosure fall into the scope of the present disclosure.

In addition, in the following description, details of embodiments are expounded concretely for explanation. However, it is noted that one or more embodiments may be implemented without explanations in details by those skilled in the art. In any other case, the known structures and devices are shown schematically to simplify the accompanying drawings.

According to a general concept of the disclosure, there is provided a color film substrate comprising a flexible base substrate and a plurality of photo spacers. The base substrate is partitioned to a plurality of sub-regions based on a plurality of parallel lines that is paralleled with a setting central axis of the base substrate, the plurality of sub-regions having the same area as each other. Each of the sub-regions is provided with a plurality of photo spacers. For any one of the plurality of sub-regions, each of the photo spacers in one of the plurality of sub-regions is configured such that a thickness of the display panel at a position corresponding to the photo spacers is increasingly changed under the same pressure force as a distance of the the one of the plurality of sub-regions from the setting central axis increases.

Figure 1:
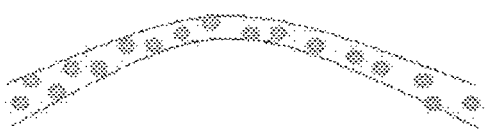
FIG. 1 is a schematic cross section view illustrating a flexible liquid crystal display panel in prior art during its bending, in which distribution of a thickness of a liquid crystal cell corresponding to different regions is shown.
Figure 2:
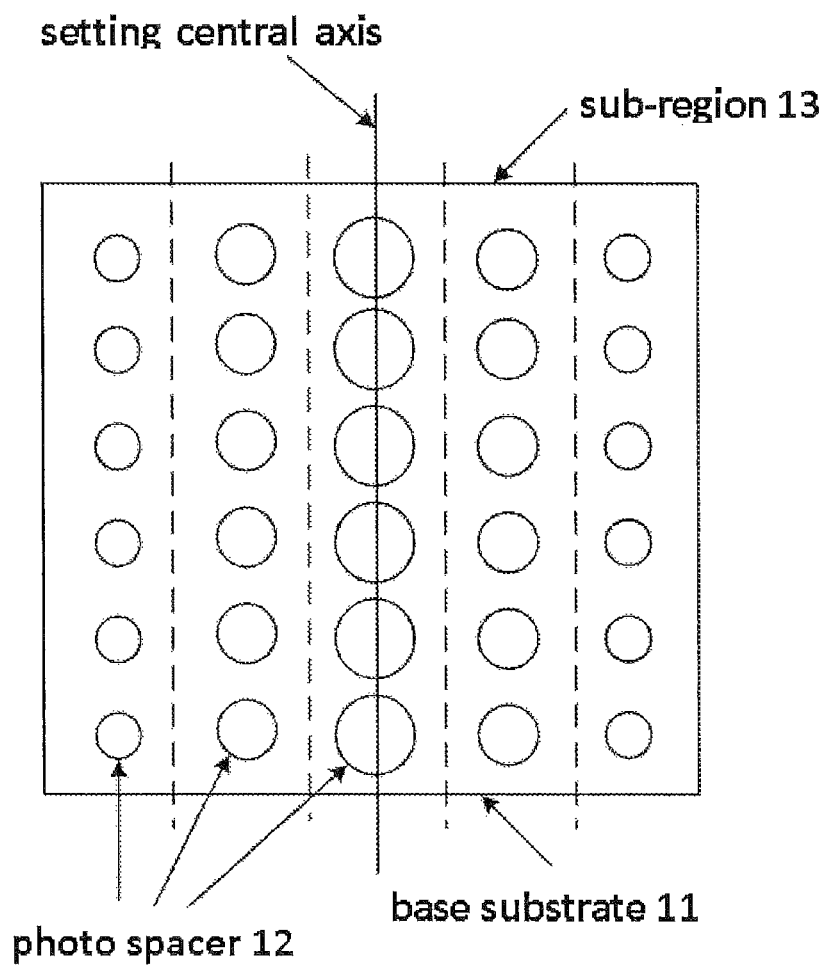
FIG. 2 is a schematic plan view illustrating a color film substrate according to a first exemplary embodiment of the present disclosure.

FIG. 2 is a schematic plan view illustrating a color film substrate according to a first exemplary embodiment of the present disclosure. Referring to FIG. 2, the color film substrate according to the embodiment includes a base substrate 11 and a plurality of photo spacers 12 disposed on the base substrate 11, the plurality of photo spacer 12 being arranged in a plurality of sub-regions 13, respectively. The plurality of sub-regions 13 are formed by partitioning the base substrate 11 based on a plurality of parallel lines that is paralleled with a setting central axis of the base substrate 11, and the plurality of sub-regions have the same area as each other. For any one of the plurality of sub-regions 13, each of the photo spacers 12 in the one of the plurality of sub-regions 13 is configured such that a thickness of the display panel at a position corresponding to the photo spacers is increasingly changed under the same pressure force as a distance of the one of the plurality of sub-regions 13 from the setting central axis increases.

In an exemplary embodiment, for any one of the plurality of sub-regions 13, a sum of a contact area of each of the photo spacers 12 in the one of the plurality of sub-regions 13 being brought into contact with the base substrate 11 becomes smaller as the distance of the one of the plurality of sub-regions 13 from the setting central axis increases. As such, the photo spacers 12 within the one of the plurality of sub-regions 13 is deformed more in a height direction under the same pressure force, which thus causes the thickness of the display panel at a position corresponding to the photo spacers 12 to be changed more under the same pressure force. FIG. 2 schematically illustrates the photo spacers 12 provided in one of the plurality of sub-regions 13 and the sum of a contact area of each of the photo spacers 12 within the one of the plurality of sub-regions 13 being brought into contact with the base substrate 11, by taking an exemplary schematic cross sectional view where contact ends of the photo spacers 12 are brought into contact with the base substrate 11 as an example.

Figure 4:
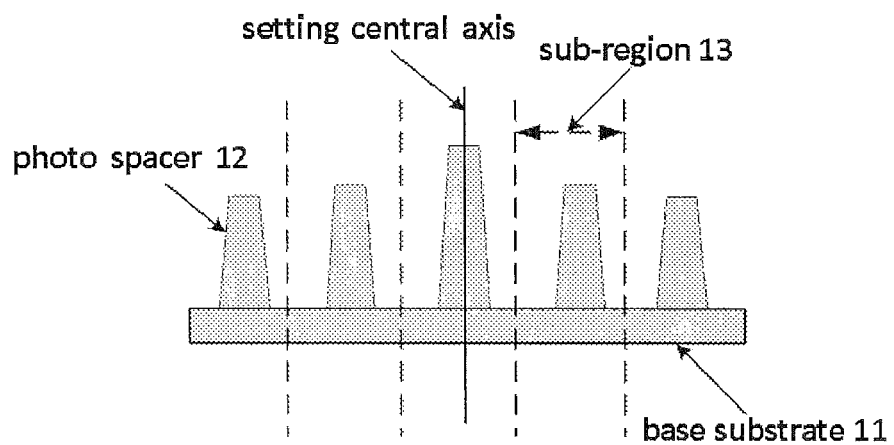
FIG. 4 is a side view illustrating the color film substrate shown in FIG. 3.

For any one of the plurality of sub-regions 13, a height of each of the photo spacers 12 in the one of the plurality of sub-regions 13 becomes smaller as a distance of the one of the plurality of sub-regions 13 from the setting central axis increases. This is shown in FIG. 4 in detail (in which the photo spacers 12 contained in any one of the plurality of sub-regions 13 and the height of each of the photo spacers 12 within the sub-regions 13 are schematically illustrated by an exemplary schematic longitudinal cross sectional view of each of the photo spacers 12).

In an exemplary embodiment of the present disclosure, the base substrate 11 may be a flexible base substrate, such as, a plastic substrate. The embodiments of the present disclosure are not limited to this. The base substrate 11 may also be other types of bendable substrate, such as, a bendable glass substrate.

Further, the setting central axis may be a centrally lateral axis of the base substrate 11 or a centrally longitudinal axis of the base substrate 11. The base substrate 11 may generally be bent respectively along a centrally lateral axis or a centrally longitudinal axis of the base substrate 11. It is also noted that the setting central axis may be set by a line or segment located on other positions of the base substrate 11 than the centrally lateral axis and the centrally longitudinal axis depending on actually bendable shapes of the base substrate 11.

In the first embodiment as shown in FIG. 2, the sum of the contact area of each of the photo spacers 12 in the one of the plurality of sub-regions 13 being brought into contact with the base substrate 11 becomes smaller as the distance of the one of the plurality of sub-regions 13 from the setting central axis increases. Any two photo spacers 12 in the plurality of sub-regions 13 may have the same height. That is, each of the photo spacers 12 may being brought into contact with the array substrate corresponding to the color film substrate where they are located, so as to maintain a uniform thickness of a liquid crystal cell between the color film substrate and the array substrate when the display panel including the color film substrate is bent, thereby increasing uniformity of the thickness of the liquid crystal cell during bending of the display panel.

In the first embodiment as shown in FIG. 2, the sums of the contact areas of the photo spacers 12 in these sub-regions 13 being brought into contact with the base substrate 11 are different from each other. When the display panel including the color film substrate is bent, each of the photo spacers 12 within the sub-region 13 that is closer to the setting central axis is subject to a greater pressure force. Meanwhile, the sum of the contact area of the photo spacers 12 within the sub-region 13 closer to the setting central axis brought into contact with the base substrate 11 becomes greater, which leads to a smaller deformation of the thickness of the photo spacers 12 within the sub-region 13 closer to the setting central axis in the height direction under the same pressure force. Thus, the display panel is subject to a substantially uniform deformation in the height direction near the setting central axis with relative to other positions. In this way, although different regions in the display panel are subject to different stress forces and the center of the bent surface of the display panel undergoes the greatest stress force when the display panel is bent, the display panel is still able to be maintained a uniform thickness of the liquid crystal cell of the display panel during its bending, thereby increasing display performance of the display panel during its bending.

Figure 3:
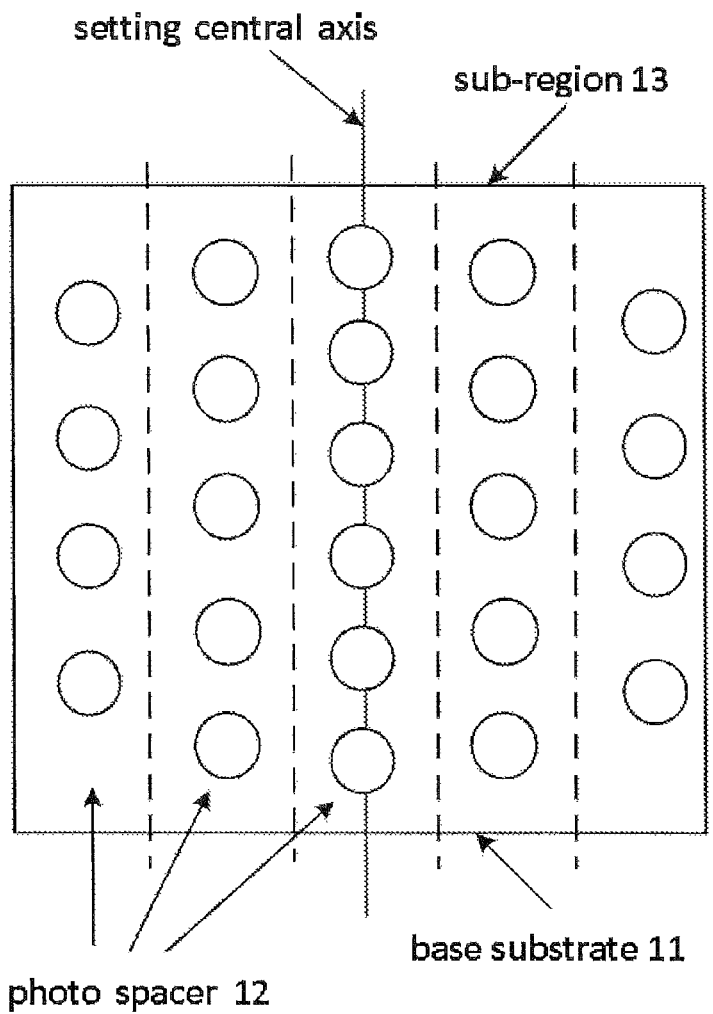
FIG. 3 is a schematic plan view illustrating a color film substrate according to a second exemplary embodiment of the present disclosure.

FIG. 3 illustrates a schematic plan view of a color film substrate of a second exemplary embodiment of the present disclosure. By referring to FIG. 3, for any one of the plurality of sub-regions 13, a height of each of the photo spacers 12 within one of the plurality of sub-regions 13 becomes smaller as a distance of the one of the plurality of sub-regions 13 from the setting central axis increases, while contact areas of any two of the photo spacers 12 brought into contact with the base substrate 11 may be the same as each other. In this embodiment, some of the plurality of photo spacers 12, generally those within the sub-region 13 being near or nearest to the setting central axis, may be maintained to be in contact with the array substrate corresponding to the color film substrate including the photo spacers 12, while the remain photo spacers 12 are not in contact with the base substrate 11 such that the end of the color film substrate thereto is hung in the air. In this way, under a pressure force of certain range, the hung configuration of the photo spacers causes greater thickness of the display panel at a position corresponding to the hung photo spacers. Thus, when the display panel including the color film substrate is not bent, the crystal cell thickness between the color film substrate and the array substrate is maintained by the part of the photo spacers 12. When the display panel including the color film substrate is bent, the part of the photo spacers 12 may be subject to smaller deformation under greater pressure force with relative to the remain photo spacers and thus the display panel at the position corresponding to the part of the photo spacers 12 is changed less in thickness. Meanwhile, the display panel at the position corresponding to the hung photo spacers is also changed in thickness under a relative smaller pressure force, such that the hung ends of the remain photo spacers 12 are brought into contact with the base substrate, thereby maintaining uniformity of the thickness of the liquid cell of the display panel and thus increasing display performance of the display panel during the bending.

In the embodiment of the present disclosure, a height of the photo spacers 12 within each sub-region or a sum of contact areas of the photo spacer 12 within each sub-region brought into contact with the base substrate 11 may be configured in gradient depending on a distance from the sub-regions where the photo spacers 12 are located on to the setting central axis of the base substrate 11, thereby maintaining uniformity of the thickness of the display panel cell and thus increasing display performance of the display panel during the bending.

Further, in the embodiment of the present disclosure, for any one of the plurality of sub-regions 13, the height of any two of the photo spacers 12 within one of the plurality of sub-regions 13 and the contact areas of the two of the photo spacers 12 brought into contact with the base substrate 11 may be the same, respectively, thereby increasing convenient of manufacture process.

Further, in the first embodiment as shown in FIG. 2 of the present disclosure, for any one of the plurality of sub-regions 13, the sum of the contact areas of the photo spacers 12 within the one of the plurality of sub-regions 13 brought into contact with the base substrate 11 becomes smaller as a distance of the one of the plurality of sub-regions 13 from the setting central axis increases. In detail, distribution densities of the photo spacers within each sub-region 13 are the same, and for any one of the plurality of sub-regions 13, the contact area of one of the photo spacers 12 within the any of the plurality of sub-regions 13 brought into contact with the base substrate 11 becomes smaller as a distance of the one of the plurality of sub-regions 13 from the setting central axis increases.

FIG. 3 is a schematic plan view of a color film substrate of a second embodiment of the present disclosure. As shown in FIG. 3, for any one of the plurality of sub-regions 13, a sum of a contact area of each of the photo spacers 12 within the one of the plurality of sub-regions 13 being brought into contact with the base substrate 11 becomes smaller as the distance of the one of the plurality of sub-regions 13 from the setting central axis increases. Specifically, contact areas of the photo spacers 12 in each sub-region 13 being brought into contact with the base substrate 11 are the same while, for any one of the plurality of sub-regions 13, the distribution density of the photo spacers within the any of the plurality of sub-regions 13 becomes smaller as a distance of the one of the plurality of sub-regions 13 from the setting central axis increases.

In the embodiment of the present disclosure, the distribution density of the photo spacers within each sub-region 13 or contact areas of the photo spacers 12 within each sub-region 13 brought into contact with the base substrate 11 may be configured in gradient depending on a distance of the sub-region where the photo spacers 12 are located from the setting central axis, so as to achieve a gradient arrangement of the sums of the contact areas of the photo spacers 12 in each sub-region brought into contact with the base substrate 11, increasing maneuverability of arrangement of the photo spacers 12. In this way, for any one of the plurality of sub-regions 13, the thickness of the display panel at the position corresponding to the photo spacers 12 within the any of the plurality of sub-regions 13 is increasingly changed under the same pressure force as a distance of the any of the plurality of sub-regions 13 from the setting central axis increases. Further, in the embodiment, such as, shown in FIG. 3, of the present disclosure, every two of the plurality of photo spacers 12 may have the same shape. As a columnar photo spacer has advantages of convenience of size controlling, high contrast, good uniformity, high durability, and good trailing effect resistance with relative to a spherical or a rod-like photo spacer, the plurality of photo spacers 12 in the embodiment of the present disclosure may generally be columnar photo spacers.

Further, due to influence from production process of the photo spacer, top ends of the pack pieces 12 are etched in more degrees when etching the material for forming the photo spacer 12. Thus, the obtained photo spacers 12 having a taper shape that is tapered from top end to bottom end of the photo spacer, rather than a normally columnar shape. In the embodiment of the present disclosure, for any one of the photo spacers 12, the area of the cross section of photo spacers 12 at its bottom end is greater than or equal to that of the one at its top end, wherein the bottom end of the photo spacer 12 is in contact with the base substrate 11.

Further, according to embodiments of the present disclosure, the cross section of the photo spacer 12 may be circle, rectangle, ellipse, triangle in shape, or in any other shape.

In an embodiment in the present disclosure, any two of the plurality of photo spacers 12 are made from the same material, such as the same inorganic material, or the same organic material. However, the embodiments of the present disclosure are not limited to these. For example, in another embodiment of the present disclosure, the photo spacers within different sub-regions may be made from materials with different elasticity coefficients. Further, for any one of the plurality of sub-regions, the elasticity coefficient of the material of the photo spacers within the one of the plurality of sub-regions are configured to decrease as the distance of the one of the plurality of sub-regions from the setting central axis increases, thereby causing the thickness of the display panel at the position corresponding to the photo spacers being changed more under the same pressure force.

It is known by those skilled in the art that the plurality of photo spacers 12 may be specifically disposed over a black matrix layer over the base substrate 11, and further, correspond to thin film transistors in the corresponding array substrate, respectively.

According to technical solutions of embodiments of the present disclosure, since heights of the photo spacers within each sub-region or sums of contact areas of the photo spacers brought into contact with the base substrate may be configured in gradient in accordance with the distance of the sub-region where the photo spacers are located from the setting central axis of the base substrate, such that the display panel may be maintained to have the uniform thickness during the bending, thereby increasing display performance during the bending.

According to an embodiment of another aspect of the present disclosure, there provides a display panel which may comprise a color film substrate and an array substrate, wherein the color film substrate is the one according to any of the above embodiments of the present disclosure. That is, in the display panel according to embodiments of the present disclosure, the photo spacers within the display panel are arranged on the color film substrate of the display panel, in the manner according to any of the above embodiments of the present disclosure, so that the display panel is maintained to have the uniform thickness during the bending, thereby increasing display performance as bent.

Further, in embodiments of the present disclosure, some or all of the photo spacers in the color film substrate may be brought into contact with the array substrate, respectively.

Specifically, when the photo spacers in the color film substrate are arranged on the color film substrate in the manner according to the first and the second embodiments of the present disclosure, the photo spacers may be brought into contact with the array substrate respectively as the photo spacers have the same height. When the plurality of photo spacers on the color film substrate are arranged on the color film substrate in the manner according to the third embodiment of the present disclosure, only some of the plurality of photo spacers are brought into contact with the array substrate as the plurality of photo spacers have different heights.

Further, in a display panel according to the embodiments of the present disclosure, the array substrate may be a flexible substrate, such as a plastic substrate, or a bendable substrate, such as a bendable glass substrate, etc.

Further, according to an embodiment of the present disclosure, there provides a display device, which may comprise a display panel according to the above embodiment. Further, the display device may be a liquid crystal display panel, an electronic paper, an Organic Light-Emitting Diode (OLED) panel, a mobile phone, a panel computer, a television set, a display, a note computer, a digital frame, a navigating instrument, etc. and any of products or components having a displaying function, and the embodiments of the present disclosure are not limited to these.

In a display panel and a display device according to embodiments of the present disclosure, heights of the photo spacers within each sub-region or sums of contact areas of the photo spacers brought into contact with the base substrate may be configured in gradient in accordance with the distance of the sub-region where the photo spacers are located from the setting central axis of the base substrate, such that the display panel may be maintained to have the uniform thickness during the bending, thereby increasing display performance during the bending.

Although several embodiments of the general inventive concept are illustrated and explained, it would be appreciated by those skilled in the art that modifications and variations can be made in these embodiments without departing from the principles and spirit of the general inventive concept of the disclosure, the scope of which is defined in the appended claims and their equivalents.

Any changes, equivalent replacement, modification within the spirit and principles of the disclosure can be made by those skilled in the art and should fall into the scope of the disclosure, if these changes and modifications belong to scope of the claims of the appended claims and their equivalents.

The invention claimed is:

1. A color film substrate for a display panel, the color film substrate comprising:
    a flexible base substrate partitioned to a plurality of sub-regions based on a plurality of parallel lines that is paralleled with a setting central axis of the base substrate, the plurality of sub-regions having the same area as each other; and a plurality of photo spacers provided in each of the plurality of sub-regions, wherein, for any one of the plurality of sub-regions, each of the photo spacers in one of the plurality of sub-regions is configured such that a thickness of the display panel at a position corresponding to the photo spacers is increasingly changed under the same pressure force as a distance of said one of the plurality of sub-regions from the setting central axis increases;

wherein a sum of a contact area of each of the photo spacers in said one of the plurality of sub-regions being brought into contact with the base substrate becomes smaller as the distance of said one of the plurality of sub-regions from the setting central axis increases;

wherein any one of the photo spacers in every one of the plurality of sub-regions has the same contact area that is brought into contact with the base substrate, and the distribution density of the photo spacers in said one of the sub-regions decreases as a distance of said one of the plurality of sub-regions from the setting central axis increases;

wherein the photo spacers within different sub-regions are made from materials with different elasticity coefficients, and further, for any one of the plurality of sub-regions, the elasticity coefficient of the material of the photo spacers within the one of the plurality of sub-regions are configured to decrease as the distance of the one of the plurality of sub-regions from the setting central axis increases.

2. The color film substrate according to claim 1, wherein a height of each of the photo spacers in said one of the plurality of sub-regions becomes smaller as a distance of said one of the plurality of sub-regions from the setting central axis increases.

3. The color film substrate according to claim 1, wherein the setting central axis comprises a centrally lateral axis of the base substrate or a centrally longitudinal axis of the base substrate.

4. The color film substrate according to claim 1, wherein any two said photo spacers in said one of the plurality of sub-regions have the same height, and the same contact area that is brought into contact with the base substrate.

5. The color film substrate according to claim 1, wherein any two of the plurality of photo spacers have the same shape.

6. The color film substrate according to claim 5, wherein a cross-sectional area of each of the plurality of photo spacers at its bottom end is greater than or equal to that of the one at its top end, the bottom end of the one being brought into contact with the base substrate.

7. The color film substrate according to claim 6, wherein the cross section of each of the photo spacers is circle, rectangle or triangle in shape.

8. The color film substrate according to claim 1, wherein the plurality of photo spacers is respectively columnar photo spacers.

9. The color film substrate according to claim 1, wherein any two of the plurality of photo spacers are made of the same material.

10. A display panel, comprising:
the color film substrate according to claim 1, and
a flexible array substrate opposite to the color film substrate.

11. The display panel according to claim 10, wherein some or all of the plurality of photo spacers in the color film substrate are brought into contact with the array substrate.

12. A display device, comprising the display panel according to claim 10.

13. The display device according to claim 12, some or all of the plurality of photo spacers in the color film substrate are brought into contact with the array substrate.

* * * * *